United States Patent [19]
Ohashi

[11] Patent Number: 5,438,558
[45] Date of Patent: Aug. 1, 1995

[54] IMAGE SIGNAL APPARATUS INCLUDING CLAMPING PROCESSING OF IMAGE SIGNAL

[75] Inventor: Kazuhito Ohashi, Kanagawa, Japan

[73] Assignee: Canon Kabushiki Kaisha, Tokyo, Japan

[21] Appl. No.: 150,588

[22] Filed: Nov. 10, 1993

Related U.S. Application Data

[63] Continuation of Ser. No. 56,817, Apr. 29, 1993, abandoned, which is a continuation of Ser. No. 662,775, Feb. 28, 1991, abandoned.

[30] Foreign Application Priority Data

Mar. 7, 1990 [JP] Japan ................... 2-503515
Mar. 7, 1990 [JP] Japan ................... 2-053516

[51] Int. Cl.⁶ ............... G11B 5/09; H04N 5/78
[52] U.S. Cl. .................... 369/48; 369/124; 369/44.34; 358/335; 358/342; 358/315; 348/695; 360/33.1; 360/67
[58] Field of Search ........... 360/27, 25, 33.1, 35.1, 360/67, 65, 46, 32; 358/166, 327, 340, 310, 315, 335, 342, 336; 369/48, 124, 44.34; 348/625, 695

[56] References Cited

U.S. PATENT DOCUMENTS

| | | | |
|---|---|---|---|
| 4,165,495 | 8/1979 | Takahashi | 369/48 |
| 4,169,219 | 9/1979 | Beard | 369/48 |
| 4,198,650 | 4/1980 | Hongu et al. | 358/315 X |
| 4,575,749 | 3/1986 | Acampora et al. | 358/315 X |
| 4,742,392 | 5/1988 | Hashimoto | 348/695 |
| 4,794,469 | 12/1988 | Kaido et al. | 360/65 X |
| 4,891,716 | 1/1990 | Andersen | 360/31 X |
| 5,075,802 | 12/1991 | Ohashi | 360/27 |
| 5,075,803 | 12/1991 | Moro et al. | 360/27 |
| 5,077,623 | 12/1991 | McSweeney | 360/27 X |
| 5,124,967 | 6/1992 | Isaka et al. | 369/48 |
| 5,220,466 | 6/1993 | Coker et al. | 360/46 |
| 5,233,482 | 8/1993 | Galbraith et al. | 360/46 |

Primary Examiner—Andrew L. Sniezek
Attorney, Agent, or Firm—Robin, Blecker, Daley & Driscoll

[57] ABSTRACT

An image signal recording and reproducing system for recording an image signal on a recording medium and for reproducing the image signal recorded on the recording medium is arranged to perform a reproducing action on the recording medium on which a sampled image signal formed by sampling the image signal is recorded to sample a reproduced signal reproduced from the recording medium and, in outputting a sampled reproduced signal, the level of the reproduced signal to be sampled is controlled according to the sampling phase of the reproduced signal. This arrangement enables the system to record the image signal on the recording medium and to reproduce the image signal without deteriorating the image signal.

25 Claims, 7 Drawing Sheets

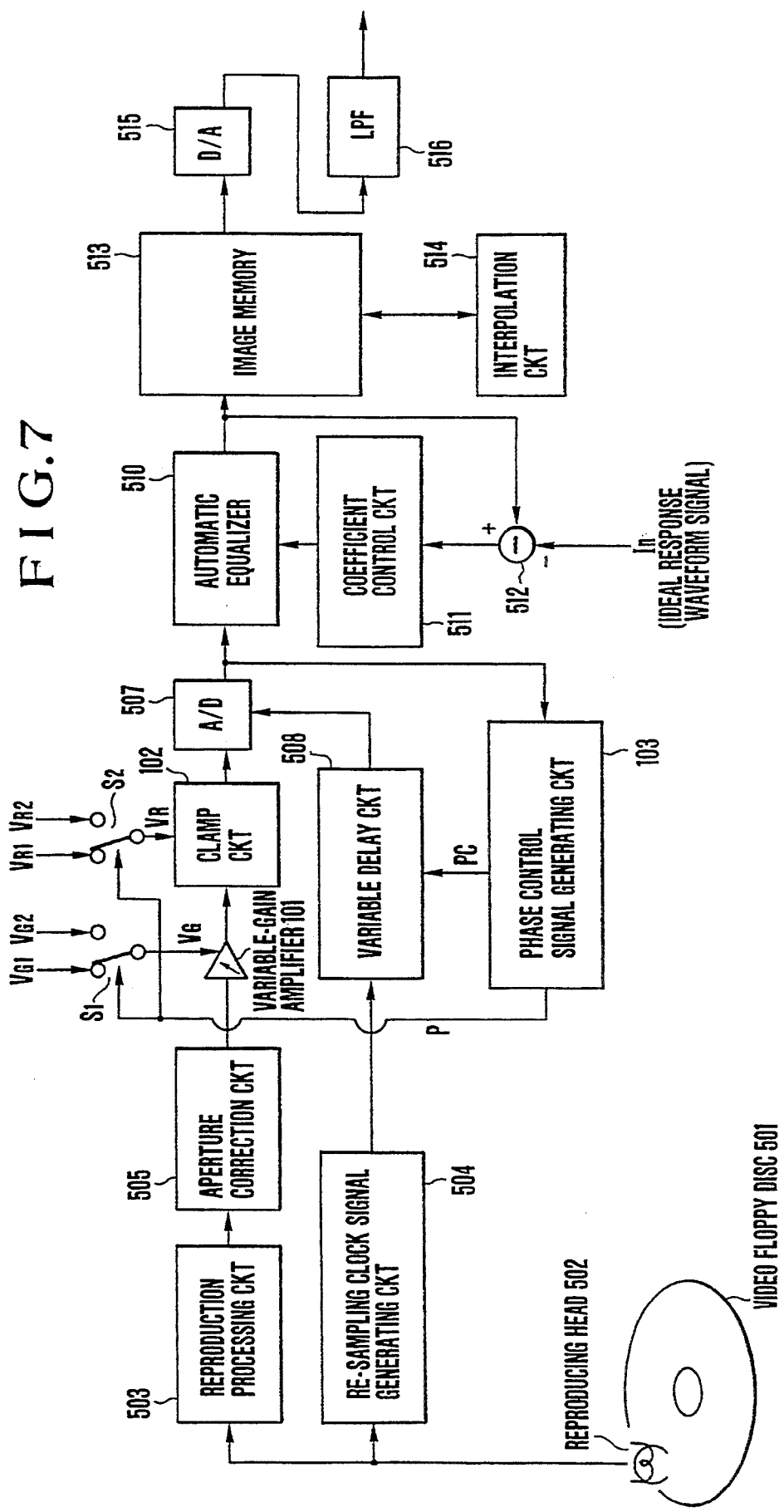

IMAGE SIGNAL APPARATUS INCLUDING CLAMPING PROCESSING OF IMAGE SIGNAL

This is a continuation under 37 CFR 1.62 of prior application Ser. No. 08/056,817, filed Apr. 29, 1993 (now abandoned) which is a continuation of Ser. No. 662,775 filed Feb. 28, 1991 (now abandoned).

BACKGROUND OF THE INVENTION

1. Field of the Invention

This invention relates to an image signal recording and reproducing system for recording an image signal on a recording medium and for reproducing the image signal recorded on the recording medium.

2. Description of the Related Art

A still video system (hereinafter referred to as the SV system) has been known as an apparatus for recording and reproducing a still image signal.

The SV system is arranged to frequency-modulate the current TV signal of, for example, the NTSC system and to record the frequency-modulated TV signal on a magnetic disc called a video floppy disc. Therefore, the image signal recorded and reproduced by the SV system has been arranged to have a degree of resolution which approximately conforms to the current TV system.

On some occasions, a picture reproduced by a still-image signal handling system like the SV system is printed out. However, the quality of the printed picture (particularly, the resolution of it) is inferior to a sliver-halide type photograph.

Meanwhile, new TV systems such as a high-definition TV (hereinafter referred to as HDTV) system have recently come to be studied. The HDTV system has about 1000 scanning lines which are about twice as many as those of the current NTSC system and also has a horizontal signal band matching with those many scanning lines.

Therefore, it has become necessary to improve the SV system into a still image recording/reproduction system capable of giving about the same resolution as that of the HDTV system or the like which has 1000×1000 picture elements (for a square picture plane).

However, use of a new recording format for the purpose of recording a still image of such a high picture quality that has 1000×1000 picture elements (for a square picture) would make the still image record thus obtained unreproducible by the reproducing device of the conventional SV system. To solve this interchangeability problem, the following method has evolved.

This method is called a CHSV (compatible high-definition still video) system. The CHSV system not only permits still image signals to be recorded and reproduced with the same degree of resolution as the HDTV system but also gives the interchangeability with the conventional SV system.

According to the CHSV system, for example, a luminance signal which has been offset-sampled at intervals of time Ts as shown in FIG. 1 of the accompanying drawings is first divided into four field image planes Ai, Bi, Ci and Di (i: 1, 2, . . . ) and recorded in four tracks on a video floppy disc in accordance with the current SV format. In reproducing, the reproduced signal is re-sampled to restore the offset-sampled luminance signal. After that, the signal thus restored is stored in a frame memory. Then, a picture element interpolation process is carried out with picture elements stored in the frame memory. By this, an image signal having a degree of resolution of about 1300×1000 picture elements can be reproduced and output by the CHSV system.

The above-stated CHSV system performs "analog transmission of sampled values" in a manner as shown in FIG. 2 through a transmission path consisting of frequency-modulating, frequency-demodulating and electro-magnetic converting elements and by performing re-sampling at the time of reproduction. In actuality, however, a series of sample values to be supplied to the transmission path is not in an impulse state as shown in FIG. 2 but has a finite width as shown in FIG. 3. Since the transmission path has a low-pass filter characteristic (Nyquist characteristics), it is necessary, for accurate restoration of the signal, to make aperture correction for the signal after it has passed through the transmission. path as shown in FIG. 3.

Further, in order to correctly carry out the analog transmission of sample values, it is necessary (i) that the transmission path has a low-pass filter characteristic and (ii) that the re-sampling process is correctly performed on the signal receiving side.

If the above-stated condition (ii) is not satisfied, in particular, ringing would take place near the edge part of the image to deteriorate the quality of the image reproduced. In view of this, for correct re-sampling on the signal receiving side, a phase reference signal which serves as a reference to the phase of re-sampling is added to the image signal to be transmitted. Then, on the signal receiving side, the phase of re-sampling can be controlled in accordance with the phase reference signal included in the image signal transmitted.

FIG. 4 is a block diagram showing in outline the arrangement of an image signal reproducing apparatus conforming to the CHSV system. To simplify the description, FIG. 4 includes only luminance signal reproducing blocks. Referring to FIG. 4, a signal recorded on a video floppy disc 501 is reproduced by a reproducing head 502. The reproduced signal is supplied to a reproduction processing circuit 503. The reproduction processing circuit 503 then performs frequency demodulation and deemphasis processes, etc., on the signal and outputs a reproduced image signal. After the circuit 503, the reproduced image signal is subjected to an aperture correction process which is performed by an aperture correction filter 505, to a clamping process which is performed by a clamp circuit 506 and is then supplied to an analog-to-digital (A/D) converter 507.

Meanwhile, a re-sampling clock signal generating circuit 504 separates, from the signal reproduced by the reproducing head 502, only a time base correcting pilot signal component which has been frequency-multiplexed with the image signal at the time of recording. A PLL (phase-locked loop) circuit disposed within the re-sampling clock signal generating circuit 504 then forms, on the basis of the pilot signal, a re-sampling clock signal fs which follows time base variations taking place in the reproduced image signal.

The re-sampling clock signal fs which is thus output from the re-sampling clock signal generating circuit 504 is supplied to a variable delay circuit 508. The variable delay circuit 508 controls the phase of the re-sampling clock signal and supplies it to the A/D converter 507. The phase controlling action of the variable delay circuit 508 on the re-sampling clock signal fs is performed under the control of a phase control signal generating circuit 509. The phase control signal generating circuit 509 is arranged to receive a re-sampled image signal from the A/D converter 507 and to form a phase control signal PC from the re-sampled image signal according to a sample value corresponding to the phase reference signal part thereof. The phase control signal PC thus formed is supplied to the variable delay circuit 508 to adjust the phase of the re-sampling clock signal to a correct phase.

The re-sampling clock signal which is thus adjusted to have a correct phase is supplied to the A/D converter 507 to be used for digitizing the reproduced image signal. The digital reproduced image signal thus obtained is Nyquist-equalized by an automatic equalizer 510.

The automatic equalizer 510 is formed by a digital filter. The equalizing characteristic of the automatic equalizer 510 is arranged to be adjustable by varying the tap coefficient of the digital filter. The tap coefficient of the digital filter is arranged to be variable by means of a coefficient control circuit 511. The tap coefficient varying action is performed as follows: a subtracter 512 is arranged to receive the re-sampled image signal output from the automatic equalizer 510 and an ideal response waveform signal In generated by an oscillator which is not shown. The subtracter 512 produces a difference between the ideal response waveform signal In and the re-sample value of the phase reference signal part of the re-sampled image signal as a result of subtraction. In accordance with the result of the subtraction, the coefficient control circuit 511 forms and produces a tap coefficient selection signal for changing the tap coefficient of the digital filter included in the automatic equalizer 510. In accordance with this signal, the automatic equalizer 510 selects a tap coefficient most apposite to the digital filter. The re-sampled image signal is thus automatically Nyquist-equalized. The digital reproduced image signal which has been thus equalized is stored in an image memory 513.

The above-stated reproduced signal processing action is performed on the signal reproduced from each of the four tracks of the video floppy disc 501. A series of sample values which is shown in FIG. 2 and which corresponds to the offset sampled luminance signal shown in FIG. 1 is eventually stored in the image memory 513.

An interpolation circuit 514 then performs an interpolation process by using the sample data stored in the image memory 513. After the interpolation process, the sample data is read out from the image memory 513. The data read out is converted into an analog signal by a digital-to-analog (D/A) converter 515. The analog signal thus obtained is output through an LPF (low-pass filter) 516 as a reproduced image signal.

As to the phase reference signal to be added to the image signal, either an impulse type signal or a step type signal is employed. Further, to let the phase reference signal have an advantage over a noise or the like which might mix therewith, the phase reference signal is generally added at about a 100% level relative to the white level of the image signal. FIG. 5 shows the waveform of the phase reference signal reproduced by the reproducing operation in a case where the impulse type phase reference signal is added to the image signal in recording. If the step type phase reference signal is added to the image signal in recording, the waveform of the reproduced phase reference signal becomes as shown in FIG. 6. As shown in FIGS. 5 and 6, a signal of the type having a sudden level change brings about a ringing component which is a transient vibration. Such a ringing component occurs not only in the phase reference signal part but also in other parts where the level of the image signal suddenly changes.

Further, the image signal reproducing apparatus according to the CHSV system shown in FIG. 4 is arranged to equalize the waveform of the reproduced image signal by means of the automatic equalizer 510 after the image signal is sampled by the A/D converter 507. Therefore, the A/D converter 507 must be arranged to have a dynamic range which is sufficient for the reproduced image signal before the waveform equalization. In other words, the dynamic range of the A/D converter 507 must be set at a value $C=(A+2\times B)$ as shown in FIG. 6. Since the maximum possible value of a value B of FIG. 6 is about $0.2\times A$, the dynamic range of the A/D converter 507 must be set at a value which is about 1.4 times as large as the dynamic range A of the input signal.

Further, considering fluctuations of the filter characteristic of the aperture correction filter 505, changes in the frequency characteristic taking place according to the reproducing track position on the video floppy disc, etc., the dynamic range of the A/D converter 507 must be set at a value larger than the above-stated value. However, with the dynamic range of the A/D converter being thus broadened, it would increase a quantization noise if the number of quantization bits remains the same. For example, if the dynamic range of the A/D converter is set at a value which is about $1.4\times A$ (A: the dynamic range of the input signal of the A/D converter), the quantization noise would increase by about 3 dB. The noise deteriorates the quality of the reproduced picture. This presents such a problem that the quantization bits are wasted.

SUMMARY OF THE INVENTION

It is a general object of this invention to provide an image signal recording and reproducing system which solves the above-stated problems of the prior art.

It is a more specific object of the invention to provide an image signal recording and reproducing system which is capable of recording an image signal on a recording medium and reproducing the image signal recorded on the recording medium without deteriorating the signal.

Under this object, an image signal recording and reproducing system which is arranged as an embodiment of the invention to record an image signal on a recording medium and to reproduce the recorded image signal from the recording medium comprises reproducing means for reproducing a signal from the recording medium on which a sampled image signal formed by sampling the image signal is recorded and for outputting the signal reproduced from the recording medium sampling means for sampling the reproduced signal output from the reproducing means and for outputting a sampled signal and level control means for controlling the level of the reproduced signal supplied from the reproducing means to the sampling means in accordance with a state of the sampling phase of the sampling means.

It is another object of the invention to provide an image signal recording and reproducing system which can be arranged simply and at a low cost.

Under that object, an image signal recording and reproducing system which is arranged as an embodiment of this invention to record an image signal on a recording medium and to reproduce the image signal recorded on the recording medium comprises reproducing means for reproducing a signal from the recording medium on which a sampled image signal formed by sampling the image signal is recorded and for outputting the signal reproduced from the recording medium sampling means for sampling the reproduced signal output from the reproducing means and for outputting a sampled signal and level control means for controlling the level of the reproduced signal supplied from the reproducing means to the sampling means in accordance with the level of the sampled signal output from the sampling means.

The above and other objects and features of the invention will become apparent from the following detailed description of embodiments thereof taken in connection with the accompanying drawings.

BRIEF DESCRIPTION OF THE DRAWINGS

FIG. 7 is a block diagram showing in outline the arrangement of an image signal reproducing apparatus which conforms to the CHSV system and is arranged according to this invention as a first embodiment thereof.

DETAILED DESCRIPTION OF THE PREFERRED EMBODIMENTS

Figure 1:
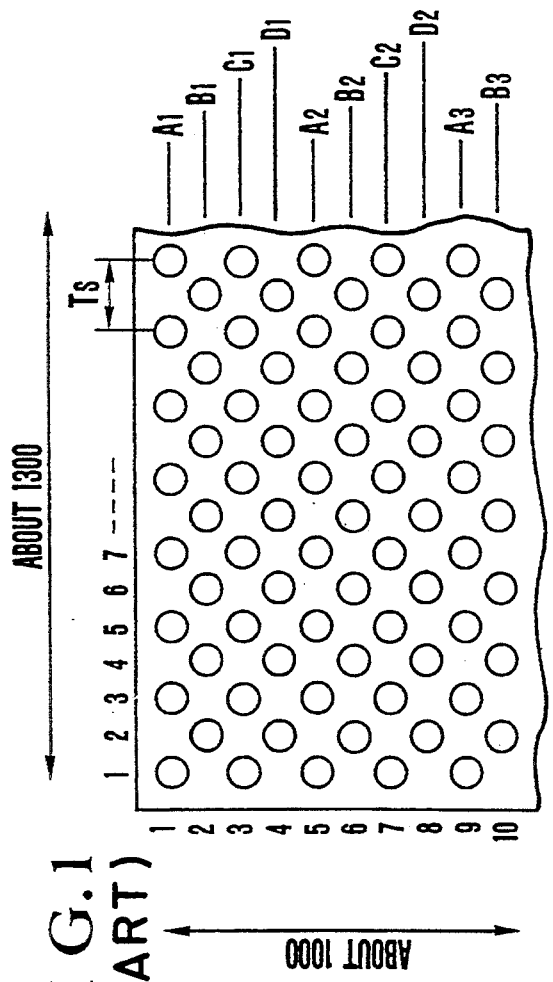
FIG. 1 shows luminance signal sampling points obtained by the CHSV system.
Figure 2:
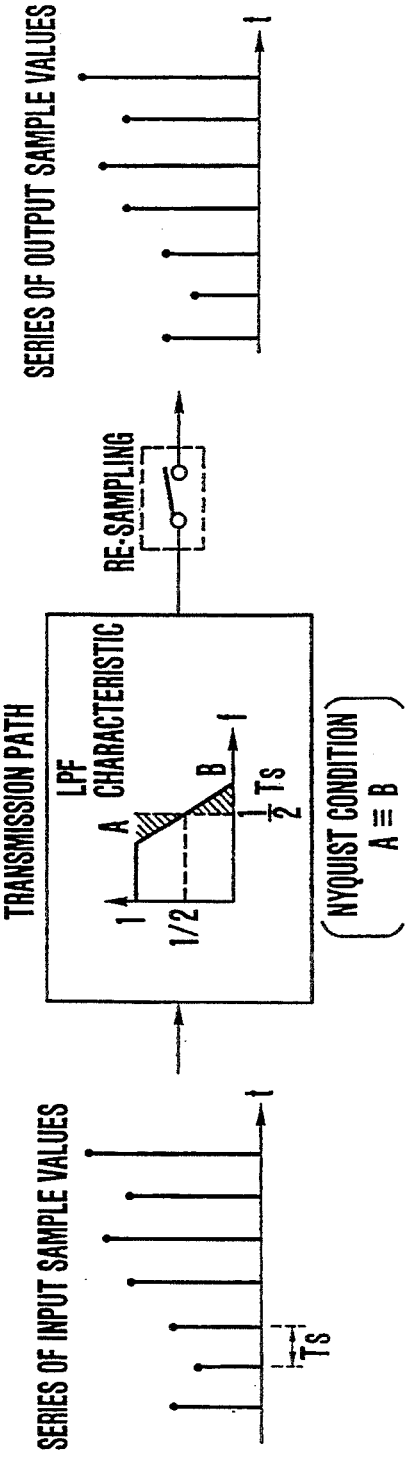
FIGS. 2 and 3 show the analog transmission of sample values.
Figure 3:
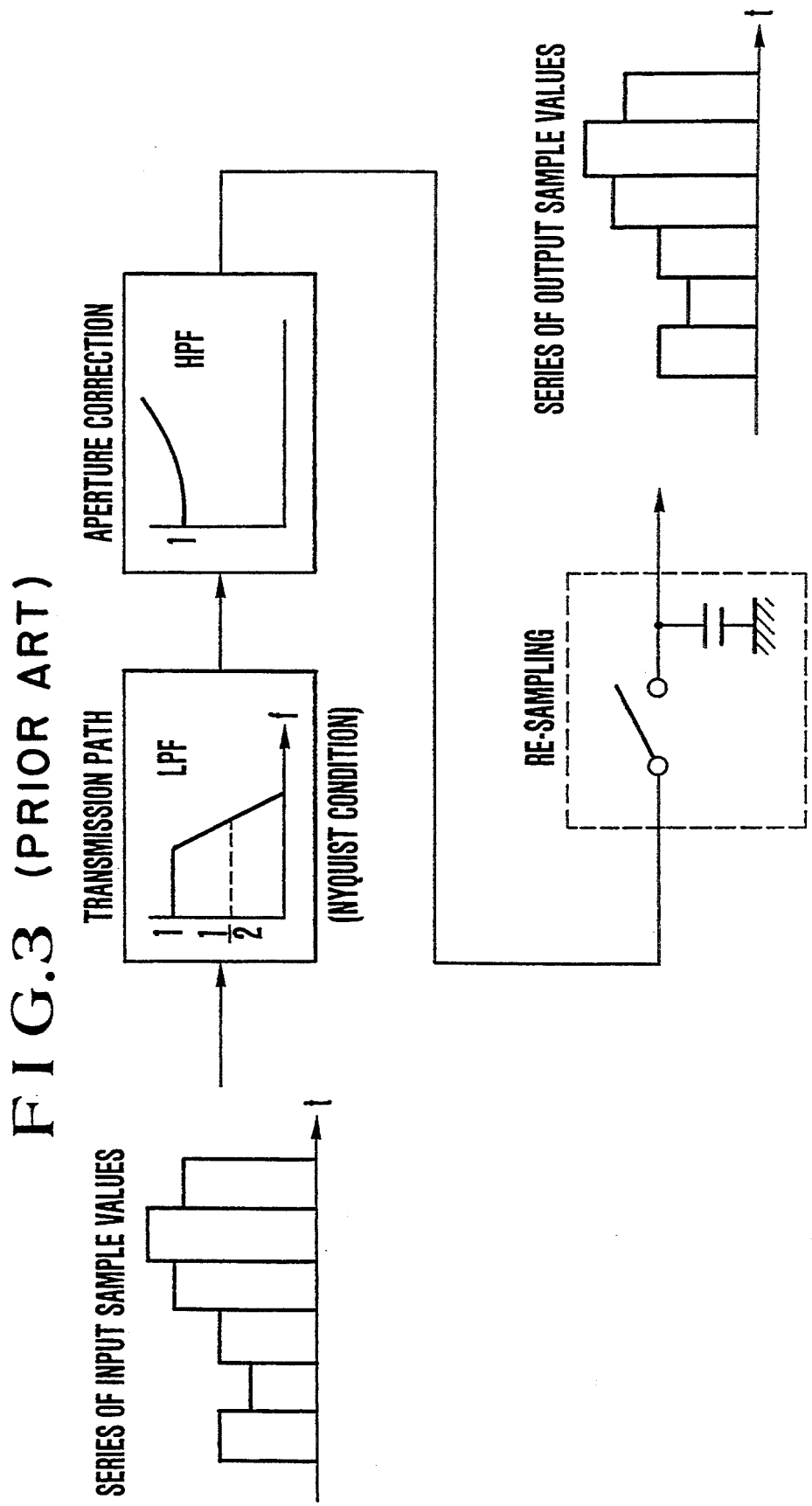
Figure 4:
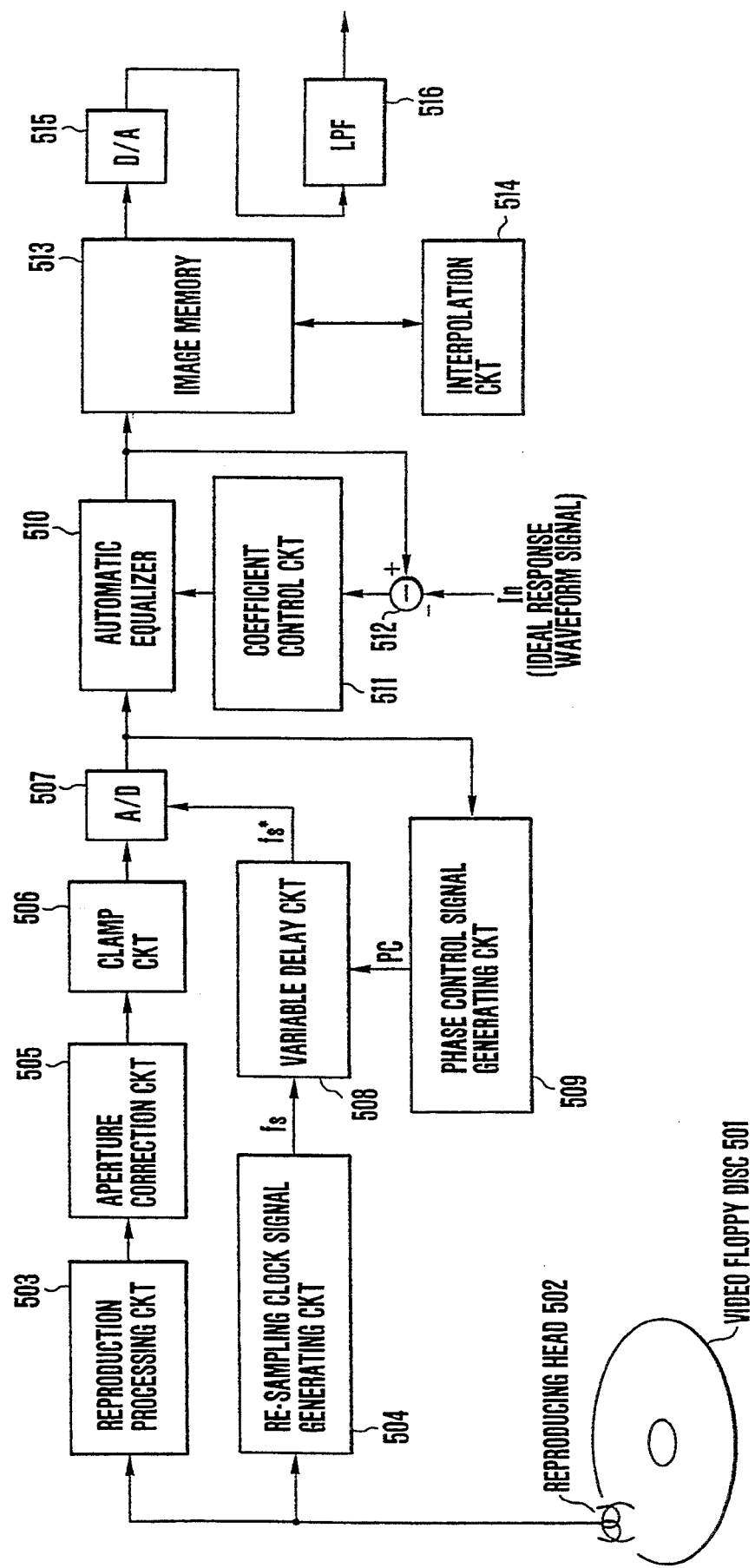
FIG. 4 is a block diagram showing in outline the arrangement of an image signal reproducing apparatus arranged according to the CHSV system.

The following describes the details of this invention through embodiments thereof:

FIG. 7 is a block diagram showing in outline the arrangement of an image signal reproducing apparatus which conforms to the CHSV system and is arranged according to this invention as a first embodiment thereof. In the apparatus shown in FIG. 7, the same components as those of the apparatus shown in FIG. 4 are indicated by the same reference numerals and symbols, and the details of them are omitted from description.

Referring to FIG. 7, a reproduced image signal which has undergone the aperture correction process at the aperture correction filter 505 is supplied via a variable-gain amplifier 101 and a clamp circuit 102 to the A/D converter 507. The A/D converter 507 then performs a re-sampling action on the reproduced image signal to produce a digital reproduced image signal.

A phase control signal generating circuit 103 is arranged to form a phase control signal PC according to the sample value of a phase reference signal part which is included in the digital reproduced image signal output from the A/D converter 507. The phase control signal PC is supplied to the variable delay circuit 508.

Further, the phase control signal generating circuit 103 detects the re-sampling phase of the digital reproduced image signal output from the A/D converter 507 to find if it is correctly controlled. The circuit 103 produces an indication signal P at "0" if the re-sampling phase of the digital reproduced image signal is found to be incorrect and at "1" if the re-sampling phase is found to be correct.

The above-stated variable-gain amplifier 101 is arranged to change the gain of the reproduced image signal from one value over to another in accordance with a gain control signal VG1 or VG2 which is selected by a switch S1. The clamp circuit 102 is arranged to change a clamp potential from one value over to another in accordance with a clamp potential control signal VR1 or VR2 which is selected by a switch S2. The switching actions of these switches S1 and S2 are performed according to the above-stated indication signal P in the following manner. The switch S1 selects the gain control signal VG1 and the switch S2 the clamp potential control signal VR1 when the indication signal P indicates "0". The switch S1 selects the gain control signal VR2 and the Switch S2 the clamp potential control signal VR2 when the indication signal P indicates "1".

Figure 8A:
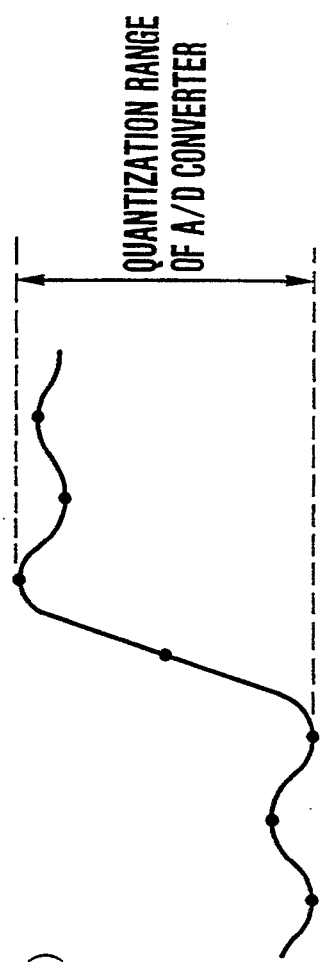
FIGS. 8(a) and 8(b) show how a quantization range varies in relation to the input signal of an A/D converter according to the correctness or incorrectness of the phase of a re-sampling action performed on a digital reproduced image signal output from the A/D converter.
Figure 8B:
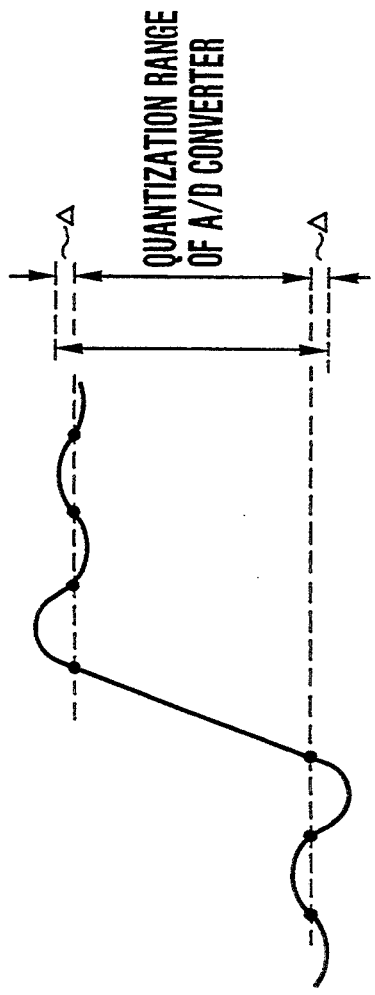

With the setting values of the clamp potential control signal VR and the gain control signal VG arranged to be changed in the above-stated manner as the indication signal P changes between "1" and "0", the quantization range of the A/D converter 507 in relation to the input signal is changed as shown in FIG. 8(a) when the indication signal P is at "0" and as shown in FIG. 8(b) when the indication signal P is at "1". Thus, the quantization range of the A/D converter 507 shown in FIG. 8(b) becomes narrower than that shown in FIG. 8(a) by a minute amount 2A.

Further, in the case of the first embodiment shown in FIG. 7, the range of the quantizing action of the A/D converter 507 on its input signal is arranged to be changed by varying both the gain control signal VG which controls the gain of the variable-gain amplifier 101 and the clamp potential control signal VR which controls the clamp potential of the clamp circuit 102. However, this arrangement may be changed to vary the quantization range of the A/D converter 507 by varying only one of the gain control signal VG and the clamp potential control signal VR. The arrangement of the apparatus can accordingly be simplified.

In the case of this embodiment, the invention is applied to the image signal reproducing apparatus which is in conformity to the CHSV system. However, the invention is not limited to the CHSV system but is applicable also to other systems using the analog transmission of sample values, such as the MUSE system or the like.

As described in the foregoing, the embodiment is arranged to change the quantization range of the A/D converter according to the correctness or incorrectness of the phase of the re-sampling action on the digital reproduced image signal output from the A/D converter. When the re-sampling phase is correct, the dynamic range of the input signal of the A/D converter is changed to minimize the quantization range of the input signal of the A/D converter. This arrangement effectively prevents the quantization bits of the A/D converter from being wasted.

Figure 9:
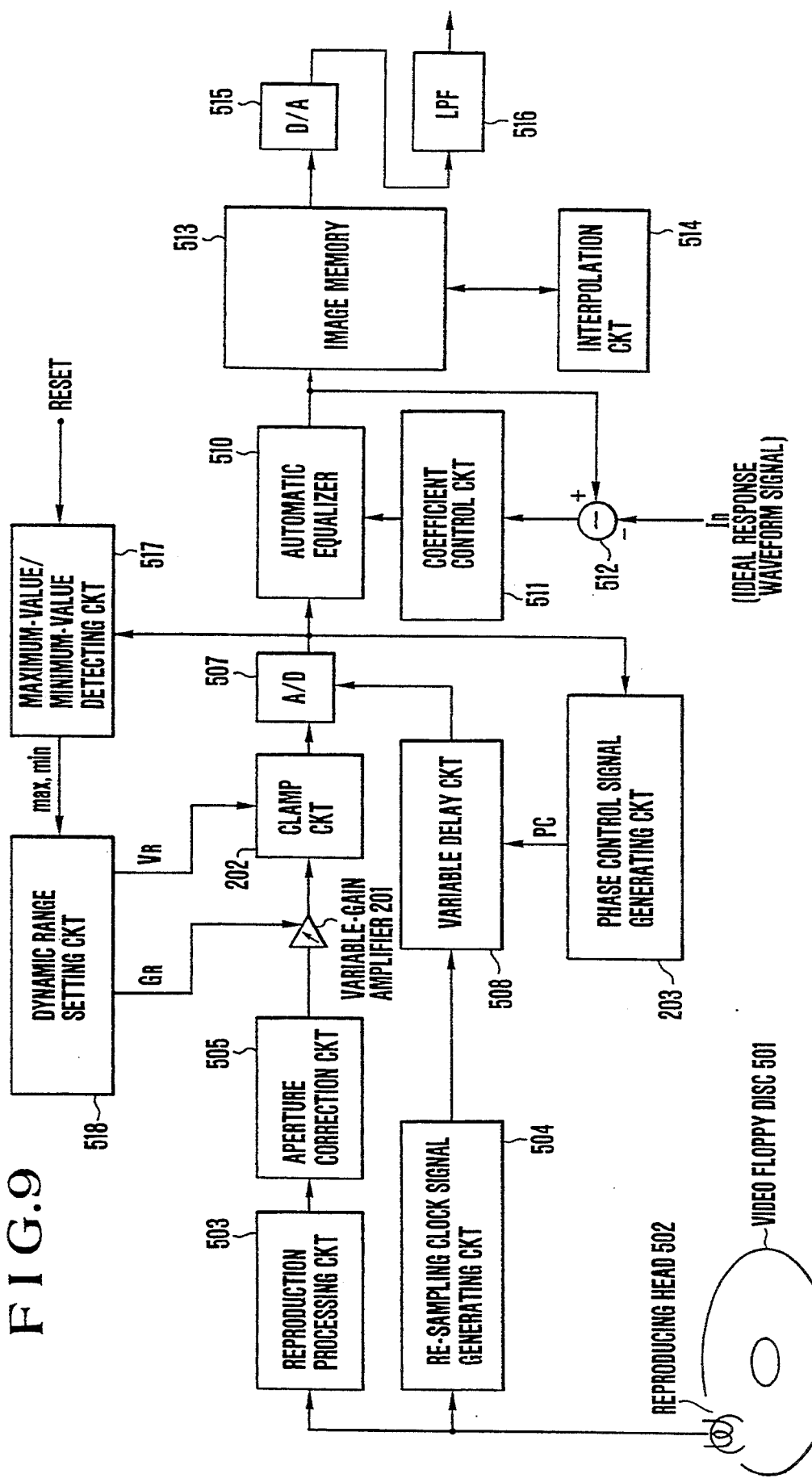
FIG. 9 is a block diagram showing in outline the arrangement of an image signal reproducing apparatus which conforms to the CHSV system and is arranged as a second embodiment of the invention.

FIG. 9 is a block diagram showing in outline the arrangement of an image signal reproducing apparatus which conforms to the CHSV system and is arranged also according to this invention as a second embodiment thereof. In FIG. 9, the same components as those of the apparatus shown in FIG. 4 are indicated by the same reference numerals, and the details of them are omitted from description.

Referring to FIG. 9, a reproduced image signal which has been subjected to the aperture correction process of the aperture correction filter 505 is supplied via a variable-gain amplifier 201 and a clamp circuit 202 to the A/D converter 507. The reproduced image signal is re-sampled and converted into a digital reproduced image signal by the A/D converter 507. The digital reproduced image signal is supplied from the A/D converter 507 to the automatic equalizer 510, a phase control signal generating circuit 203 and a maximum-value/minimum-value detecting circuit 517. The phase control signal generating circuit 203 forms a phase control signal PC according to a sample value corresponding to a phase reference signal part included in the digital reproduced image signal output from the A/D converter 507. The phase control signal PC is supplied to the variable delay circuit 508.

The maximum-value/minimum-value detecting circuit 517 is arranged to detect the maximum and minimum values of the digital reproduced image signal supplied to the circuit 517 during a given period of time. The period of time during which the maximum and minimum values of the digital reproduced image signal are detected by the maximum-value/minimum-value detecting circuit 517 is controlled by a reset pulse supplied from the outside. Further, a reset signal having the same frequency as the frequency of vertical synchronizing pulses may be used for the above-stated reset pulse.

Figure 6:
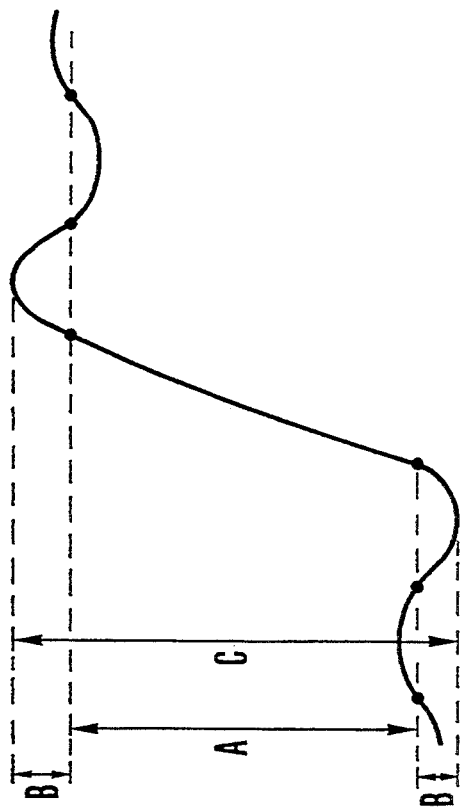
FIG. 6 shows the waveform of a reproduced phase reference signal obtained at the time of reproduction in a case where a step type phase reference signal is added to an image signal in recording.
Figure 5:
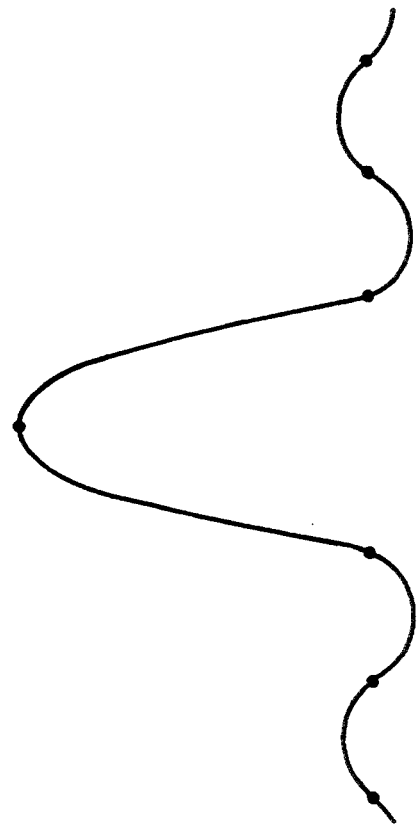
FIG. 5 shows the waveform of a reproduced phase reference signal obtained at the time of reproduction in a case where an impulse type phase reference signal is added to an image signal in recording.

The maximum and minimum values detected by the maximum-value/minimum-value detecting circuit 517 are supplied to a dynamic range setting circuit 518 as maximum value data "max" and minimum value data "min" respectively. The dynamic range setting circuit 518 is arranged to form, from the maximum value data "max" and the minimum value data "min", a clamp potential control signal VR for controlling the clamp potential of the clamp circuit 202 and a gain control signal GR for controlling the gain of the variable-gain amplifier 201. By these control signals, the gain of the variable-gain amplifier 201 and the clamp potential of the clamp circuit 202 are controlled in such a way as to have the maximum and minimum levels of quantization close to the maximum and minimum values of the digital reproduced image signal output from the A/D converter 507 respectively. As a result, the dynamic range of the signal supplied to the A/D converter 507 is controlled to be within a range from "A" to "A+2B" as shown in FIG. 6, so that the quantization bits can be prevented from being wasted.

In the second embodiment shown in FIG. 9, the quantization range of the A/D converter 507 relative to its input signal is arranged to be varied by controlling both the gain of the variable-gain amplifier 201 and the clamp potential of the clamp circuit 202 according to the maximum and minimum values of the digital reproduced image signal output from the A/D converter 507 during a given period of time. However, this arrangement may be changed to vary the quantization range for the input signal of the A/D converter 507 by controlling only one of the gain of the variable-gain amplifier 201 and the clamp potential of the clamp circuit 202. The arrangement of the embodiment can be simplified by this modification.

While this invention is applied to the image signal reproducing apparatus of the CHSV system in the case of the second embodiment, the invention is applicable also to apparatuses using the analog transmission of sample values according to other systems, such as the MUSE system or the like.

As described in the foregoing, this embodiment is arranged to automatically adjust the input signal quantization range of the A/D converter in such a way as to be always apposite to the digital reproduced image signal output from the A/D converter. Therefore, the quantization bits of the A/D converter can be prevented from being wasted.

In accordance with this invention, an image signal recording and reproducing system can be arranged in a simple manner to be capable of recording an image signal on a recording medium and reproducing the recorded image signal without deteriorating the signal.

What is claimed is:

1. An image signal reproducing apparatus for reproducing an image signal recorded on a recording medium, comprising:
    (A) reproducing means for effecting reproduction from the recording medium on which the image signal is recorded and for outputting a reproduced signal reproduced from the recording medium;
    (B) clamp means for clamping the reproduced signal outputted from said reproducing means and for outputting a clamped signal;
    (C) analog-to-digital converting means for converting the reproduced signal outputted from said clamp means into a digital signal and for outputting a converted digital signal;
    (D) digital signal processing means for processing the digital signal output from said analog-to-digital converting means; and
    (E) control means for controlling a clamping characteristic of said clamp means in accordance with a level of a signal represented by the digital signal outputted from said analog-to-digital converting means.

2. An apparatus according to claim 1, wherein said analog-to-digital converting means includes a clock signal generating means for a clock signal synchronized in phase with the reproduced signal outputted from said reproducing means, and is arranged to form the digital signal in such a manner that the reproduced signal outputted from said clamp means is analog-to-digital converted in accordance with the clock signal outputted from said clock signal generating means.

3. An image signal reproducing apparatus for reproducing an image signal recorded on a recording medium, comprising:
    (A) reproducing means for effecting reproduction from the recording medium on which the image signal is recorded and for outputting a reproduced signal from the recording medium;
    (B) amplifying means for amplifying the reproduced signal outputted from said reproducing means and for outputting an amplified signal;

(C) clamp means for clamping and outputting the reproduced signal outputted from said amplifying means;

(D) analog-to-digital converting means for converting the reproduced signal outputted from said clamp means into a digital signal and for outputting a converted digital signal;

(E) digital signal processing means for processing the digital signal outputted from said analog-to-digital converting means; and (F) control means for controlling an amplifying characteristic of said amplifying means and a clamping characteristic of said clamp means in accordance with a signal level represented by the digital signal outputted from said analog-to-digital converting means.

4. An apparatus according to claim 3, wherein said control means includes detecting means for detecting a dynamic range of a signal represented by the digital signal output from said analog-to-digital converting means during a predetermined period of time and is arranged to control the amplifying characteristic of said amplifying means and the clamping characteristic of said clamp means in accordance with a result of detection effected by said detecting means.

5. An image signal reproducing apparatus for reproducing an image signal recorded on a recording medium, comprising:

(A) reproducing means for effecting reproduction from the recording medium on which the image signal is recorded and for outputting a reproduced signal from the recording medium;

(B) clamp means for clamping the reproduced signal outputted from said reproducing means and for outputting a clamped signal;

(C) analog-to-digital converting means for converting the reproduced signal outputted from said clamp means into a digital signal and for outputting a converted digital signal;

(D) digital signal processing means for processing the digital signal outputted from said analog-to-digital converting means;

(E) detecting means for detecting a dynamic range of a signal represented by the digital signal outputted from said analog-to-digital converting means during a predetermined period of time; and (F) control means for controlling a clamping characteristic of said clamp means in accordance with a result of detection effected by said detecting means.

6. An image signal reproducing apparatus for reproducing an image signal recorded on a recording medium, comprising:

(A) reproducing means for effecting reproducing from the recording medium on which the image signal is recorded and for outputting a reproduced signal from the recording medium;

(B) amplifying means for amplifying the reproduced signal outputted from said reproducing means and for outputting an amplified signal;

(C) clamp means for clamping and outputting the reproduced signal output from said amplifying means;

(D) analog-to-digital converting means for converting the reproduced signal outputted from said clamp means into a digital signal and for outputting a converted digital signal;

(E) digital signal processing means for processing the digital signal outputted from said analog-to-digital converting means;

(F) detecting means for detecting a dynamic range of a signal represented by the digital siqnal outputted from said analog-to-digital converting means during a predetermined period of time; and (G) control means for controlling an amplifying characteristic of said amplifying means and a clamping characteristic of said clamp means in accordance with a result of detection effected by said detecting means.

7. An apparatus according to claim 6, wherein said control means includes detecting means for detecting a maximum value and a minimum value of a signal represented by the digital signal outputted from said analog-to-digital converting means during a predetermined period of time and is arranged to control the amplifying characteristic of said amplifying means and the clamping characteristic of said clamp means in accordance with the result of detection effected by said detecting means.

8. An image signal reproducing apparatus for reproducing an image signal recorded on a recording medium, comprising:

(A) reproducing means for effecting reproduction from the recording medium on which the image signal is recorded and for outputting a reproduced signal reproduced from the recording medium;

(B) clamp means for clamping the reproduced signal outputted from said reproducing means and for outputting a clamped signal;

(C) analog-to-digital converting means for converting the reproduced signal outputted from said clamp means into a digital signal and for outputting a converted digital signal;

(D) digital signal processing means for processing the digital signal outputted from said analog-to-digital converting means;

(E) detecting means for detecting maximum value and minimum value of a signal represented by the digital signal outputted by said analog-to-digital converting means during a predetermined period of time; and (F) control means for controlling a clamping characteristic of said clamp means in accordance with a result of detection effected by said detecting means.

9. An image signal reproducing apparatus for reproducing an image signal recorded on a recording medium, comprising:

(A) reproducing means for effecting reproduction from the recording medium on which the image signal is recorded and for outputting a reproduced signal reproduced from the recording medium;

(B) amplifying means for amplifying the reproduced signal outputted from said reproducing means and for outputting an amplified signal;

(C) clamp means for clamping and outputting the reproduced signal outputted from said amplifying means;

(D) analog-to-digital converting means for converting the reproduced signal outputted from said clamp means into a digital signal and for outputting a converted digital signal;

(E) digital signal processing means for processing the digital signal outputted from said analog-to-digital converting means;

(F) detecting means for detecting maximum value and minimum value of a signal represented by the digital signal outputted from said analog-to-digital converting means during a predetermined period of time; and (G) control means for controlling an amplifying characteristic of said amplifying means and a clamping characteristic of said clamp means in accordance with a result of detection effected by said detecting means.

10. An image signal processing apparatus for processing an image signal, comprising:

(A) image signal generating means for generating the image signal;

(B) clamp means for clamping the image signal outputted from said image signal generating means and for outputting a clamped image signal;

(C) analog-to-digital converting means for converting the clamped image signal outputted from said clamp means into a digital image signal and for outputting a converted digital image signal;

(D) digital image signal processing means for processing the digital image signal outputted from said analog-to-digital converting means; and (E) control means for controlling a clamping characteristic of said clamp means in accordance with a level of a signal represented by the digital image signal outputted from said analog-to-digital converting means.

11. An apparatus according to claim 10, wherein said analog-to-digital converting means includes clock signal generating means for a clock signal synchronized in phase with the image signal outputted from said image signal generating means, and is arranged to form the digital image signal in such a manner that the image signal outputted from said clamp means is analog-to-digital converted in accordance with the clock signal outputted from said clock signal generating means.

12. An apparatus according to claim 10, wherein said control means includes detecting means for detecting a dynamic range of a signal represented by the digital image signal outputted from said analog-to-digital converting means during a predetermined period of time and is arranged to control the amplifying characteristic of said amplifying means and the clamping characteristic of said clamp means in accordance with a result of detection effected by said detecting means.

13. An apparatus according to claim 10, wherein said control means includes detecting means for detecting a maximum level and a minimum level of a signal represented by the digital image signal outputted from said analog-to-digital converting means during a predetermined period of time and is arranged to control the amplifying characteristic of said amplifying means and the clamping characteristic of said clamp means in accordance with a result of detection effected by said detecting means.

14. An image signal processing apparatus for processing an image signal, comprising:

(A) image signal generating means for generating the image signal;

(B) amplifying means for amplifying the image signal outputted frm said image signal generating means and for outputting an amplified image signal;

(C) clamp means for clamping the amplified image signal Outputted from said amplifying means and for outputting a clamped image signal;

(D) analog-to-digital converting means for converting the clamped image signal outputted from said clamp means into a digital image signal and for outputting a converted digital image signal;

(E) digital signal processing means for processing the digital image signal outputted from said analog-to-digital converting means; and (F) control means for controlling an amplifying characteristic of said amplifying means and a clamping characteristic of said clamp means in accordance with the digital image signal outputted from said analog-to-digital converting means.

15. An apparatus according to claim 14, wherein said analog-to-digital converting means includes clock signal generating means for a clock signal synchronized in phase with the image signal outputted from said image signal generating means, and is arranged to form the digital image signal in such a manner that the image signal outputted from said clamp means is analog-to-digital converted in accordance with the clock signal outputted from said clock signal generating means.

16. An apparatus according to claim 14, wherein said control means includes detecting means for detecting a dynamic range of a signal represented by the digital image signal outputted from said analog-to-digital converting means during a predetermined period of time and is arranged to control the amplifying characteristic of said amplifying means and the clamping characteristic of said clamp means in accordance with a result of detection effected by said detecting means.

17. An apparatus according to claim 14, wherein said control means includes detecting means for detecting a maximum level and a minimum level of a signal represented by the digital image signal outputted from said analog-to-digital converting means during a predetermined period of time and is arranged to control the amplifying characteristic of the amplifying means and the clamping characteristic of said clamp means in accordance with the result of detection effected by said detecting means.

18. An image signal processing apparatus for processing an image signal, comprising:

(A) image signal generating means for generating the image signal;

(B) clamp means for clamping the image signal generated from said image signal generating means and outputting a clamped image signal;

(C) digital converting means for converting the image signal outputted from said clamp means into a digital image signal and for outputting a converted digital image signal;

(D) digital image signal processing means for processing the digital image signal outputted from said digital converting means; and (E) control means for controlling a clamping characteristic of said clamp means in accordance with the digital image signal output from said digital converting means.

19. An apparatus according to claim 18, wherein said digital converting means includes clock signal generating means for generating a clock signal synchronized in phase with the image signal generated by said image signal generating means and said digital converting means is arranged to convert the image signal output from said clamp means in accordance with the clock signal generated by said clock signal generating means.

20. An apparatus according to claim 18, wherein said control means includes detecting means for detecting a dynamic range of the digital image signal output from said digital converting means, and the control means is arranged to control an amplifying characteristic of amplifying means and a clamping characteristic of said clamp means in accordance with a result of detection effected by said detecting means.

21. An apparatus according to claim 18, wherein said control means includes detecting means for detecting a minimum level and a maximum level of the digital image signal output from said digital converting means, and the control means is arranged to control an amplifying characteristic of amplifying means and a clamping characteristic of said clamp means, in accordance with a result of detection effected by said detecting means.

22. An image signal processing apparatus for processing an image signal, comprising:

(A) image signal generating means for generating the image signal;

(B) amplifying means for amplifying the image signal generated from said image signal generating means and outputting an amplified image signal;

(C) clamp means for clamping and outputting the image signal outputted from said amplifying means;

(D) digital converting means for converting the image signal outputted from said clamp means into a digital image signal and for outputting a converted image digital signal;

(E) digital signal processing means for processing the digital image signal outputted from said digital converting means; and (F) control means for controlling an amplifying characteristic of said amplifying means and a clamping characteristic of said clamp means in accordance with the digital image signal output from said digital converting means.

23. An apparatus according to claim 22, wherein said digital converting means includes clock signal generating means for generating a clock signal synchronized in phase with the image signal generated by said image signal generating means, and said digital converting means is arranged to convert the image signal output from said clamp means into the digital image signal, in accordance with the clock signal generated by said clock signal generating means.

24. An apparatus according to claim 22, wherein said control means includes detecting means for detecting a dynamic range of the digital image signal output from said digital converting means and the control means is arranged to control the amplifying characteristic of said amplifying means and the clamping characteristic of said clamp means, in accordance with a result of detection effected by said detecting means.

25. An apparatus according to claim 22, wherein said control means includes detecting means for detecting a minimum level and a maximum level of the digital image signal output from said digital converting means, during a predetermined period, and said control means is arranged to control the amplifying characteristic of said amplifying means and the clamping characteristic of said clamp means in accordance with a result of detection effected by said detecting means.

* * * * *

UNITED STATES PATENT AND TRADEMARK OFFICE
CERTIFICATE OF CORRECTION

PATENT NO. : 5,438,558
DATED : August 1, 1995
INVENTOR(S) : Kazuhito Ohashi

It is certified that error appears in the above-indentified patent and that said Letters Patent is hereby corrected as shown below:

Cover Page, Item [30]. Change "2-503515" to -- 2-053515 --.

Cover Page, Item [57], line 7, After "recorded" insert -- , --.

Cover Page, Item [57], line 8, After "medium" insert -- , --.

Col. 4, line 56. After "medium" insert -- , --.

Col. 5, line 7. After "medium" insert -- , --.

Col. 11, line 67. Change "Outputted" to -- outputted --.

Signed and Sealed this

Twenty-first Day of November, 1995

Attest:

BRUCE LEHMAN

*Attesting Officer*    *Commissioner of Patents and Trademarks*